US009264898B2

(12) United States Patent
Schroeder et al.

(10) Patent No.: US 9,264,898 B2
(45) Date of Patent: Feb. 16, 2016

(54) NON-MOBILE AUTHENTICATION FOR MOBILE NETWORK GATEWAY CONNECTIVITY

(75) Inventors: Hartmut Schroeder, Duisburg (DE); Nikolas Dawson Kitson, San Jose, CA (US); Sreenivasa Tellakula, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 669 days.

(21) Appl. No.: 13/553,543

(22) Filed: Jul. 19, 2012

(65) Prior Publication Data

US 2013/0288644 A1    Oct. 31, 2013

Related U.S. Application Data

(60) Provisional application No. 61/639,008, filed on Apr. 26, 2012.

(51) Int. Cl.
*H04W 4/00* (2009.01)
*H04M 1/66* (2006.01)
*H04W 12/06* (2009.01)

(52) U.S. Cl.
CPC ................................ *H04W 12/06* (2013.01)

(58) Field of Classification Search
CPC ................... H04W 12/06; H04W 4/00–4/003
USPC ........... 455/411, 404.1, 404.2, 405, 406, 410, 455/432.1–435.3, 550.1, 551, 556.1–561; 370/331, 235; 713/202, 171; 709/230
See application file for complete search history.

(56) References Cited

U.S. PATENT DOCUMENTS 7,336,941 B1 * 2/2008 Clingerman et al. ....... 455/404.1
2004/0162998 A1 * 8/2004 Tuomi et al. .................. 713/202
(Continued)

FOREIGN PATENT DOCUMENTS

| CN | 1674497 A | 9/2005 |
| CN | 103124440 A | 5/2013 |
| EP | 1624639 A1 | 2/2006 |

OTHER PUBLICATIONS

3GPP, 3GPP TR 23.852 V1.1.0, Technical Specifications Group Services and Systems Aspects; Study on S2a Mobility based on GTP & WLAN access to EPC (SaMOG); Stage 2 (Release 11), 2011-12.*
(Continued)

*Primary Examiner* — San Htun
(74) *Attorney, Agent, or Firm* — Shumaker & Sieffert, P.A.

(57) ABSTRACT

In general, techniques are described for emulating mobile authentication methods to establish authenticated connectivity between a mobile service provider gateway and a wireless device attached to an alternate access network. For example, a system operating according to the described techniques includes a mobile service provider network, an alternate access network having an access gateway, and an authentication server of the mobile service provider network that receives a network access request. A subscriber database responds to the network access request with virtual mobility information, wherein the network access request does not include an International Mobile Subscriber Identity (IMSI), and wherein the virtual mobility information comprises a virtual IMSI. The access gateway uses the virtual mobility information to signal a mobile network gateway of the mobile service provider network to establish a service session for the wireless device over the alternate access network that is anchored by the mobile network gateway.

24 Claims, 10 Drawing Sheets

(56) References Cited

U.S. PATENT DOCUMENTS

| | | | |
|---|---|---|---|
| 2010/0027533 A1* | 2/2010 | Kant et al. | H04L 45/00 370/355 |
| 2011/0128913 A1* | 6/2011 | Chowdhury | H04L 63/0892 370/328 |
| 2012/0269167 A1* | 10/2012 | Velev et al. | 370/331 |
| 2013/0208703 A1* | 8/2013 | Sugimoto | H04L 12/66 370/331 |

OTHER PUBLICATIONS

3GPP, 3GPP TS 23.402 V10.6.0, Architecture enhancements for non-3GPP accesses (Release 10), 2011-12.*

Extended European Search Report issued Jul. 22, 2013 in corresponding EP Application No. 13153007.3, 5 pgs.
U.S. Appl. No. 12/967,977, filed Dec. 14, 2010, and entitled "Multi-Service VPN Network Client for Wireless Device,".
U.S. Appl. No. 13/247,357, filed Sep. 28, 2011, and entitled "Network Address Preservation in Mobile Networks,".
U.S. Appl. No. 13/247,308, filed Sep. 28, 2011, and entitled "Credential Generation for Automatic Authentication on Wireless Access Network,".
3GPP TR 23.852 V1.0.0, "3rd Generation Partnership Project; Technical Specification Group Services and Systems Aspects; Study on S2a Mobility based on GTP & WLAN access to EPC (SaMOG); Stage 2 (Release 11)," Technical Report, Dec. 2011, 40 pp.
First Office Action, and translation thereof, from counterpart Chinese Patent Application No. 2013100347614, dated Sep. 22, 2015, 22 pp.

* cited by examiner

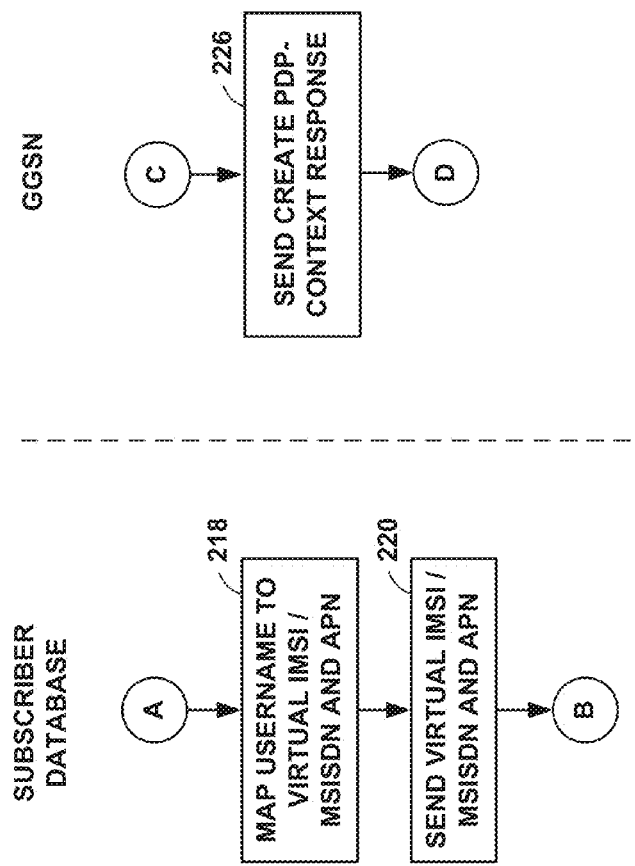

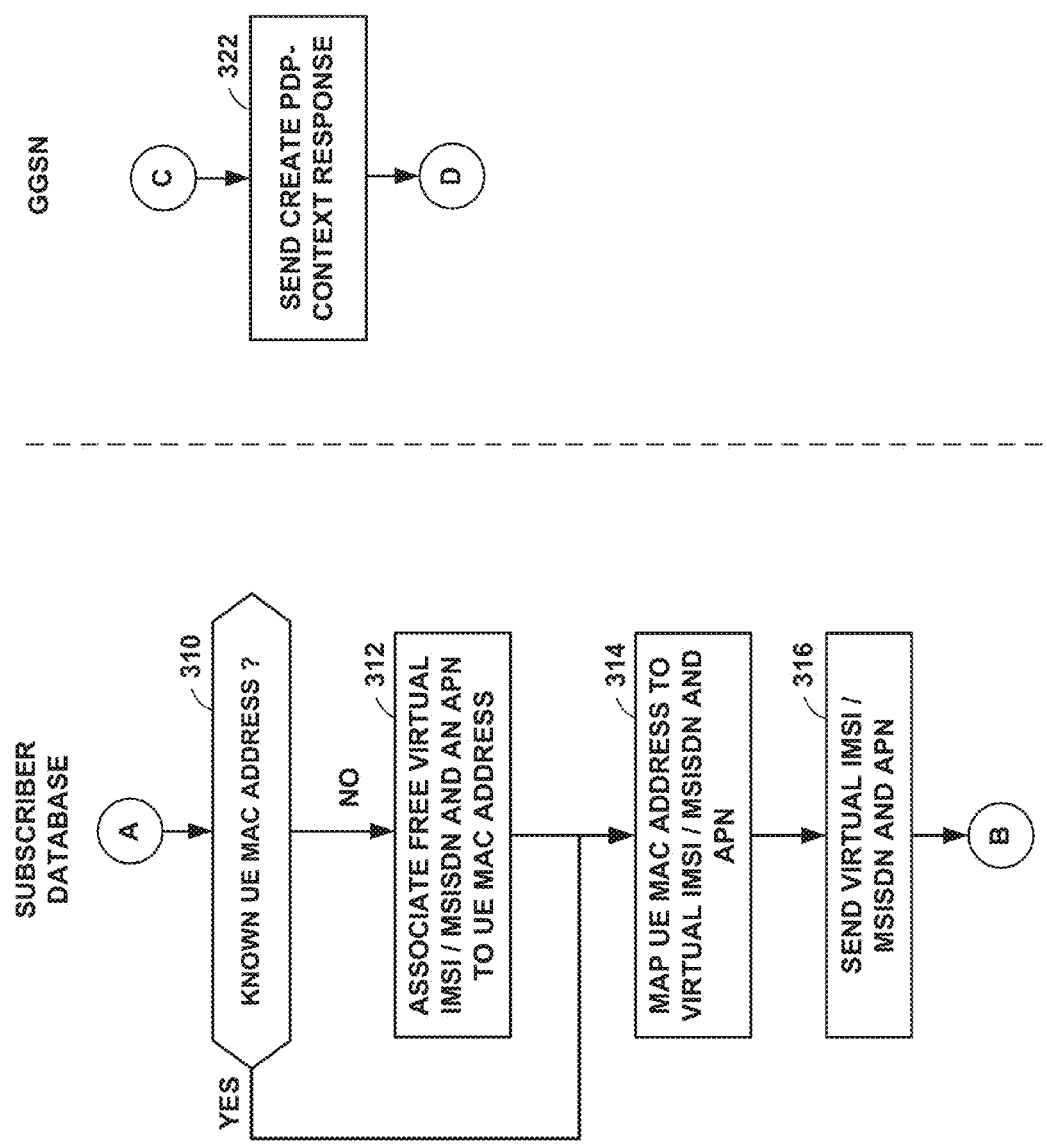

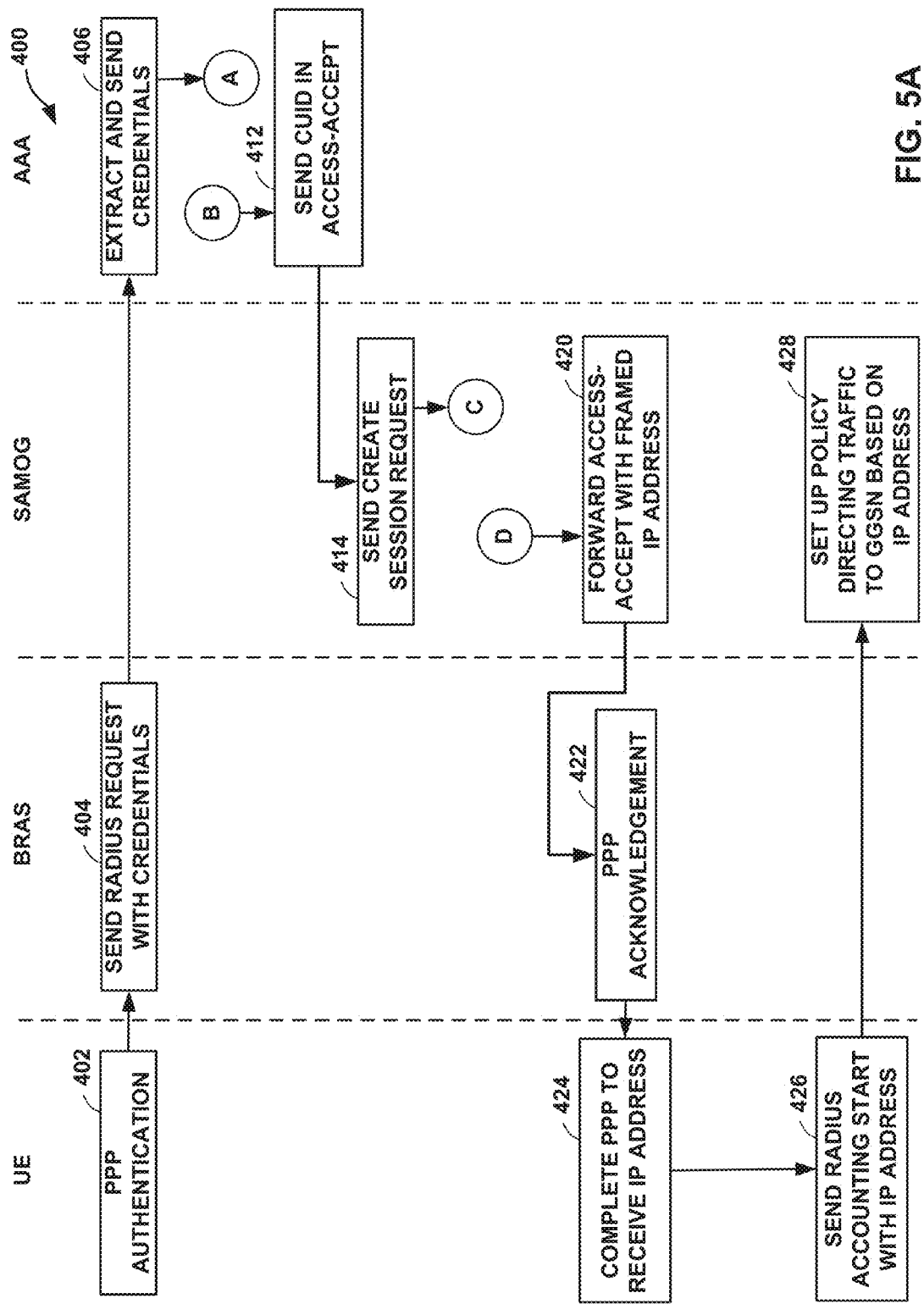

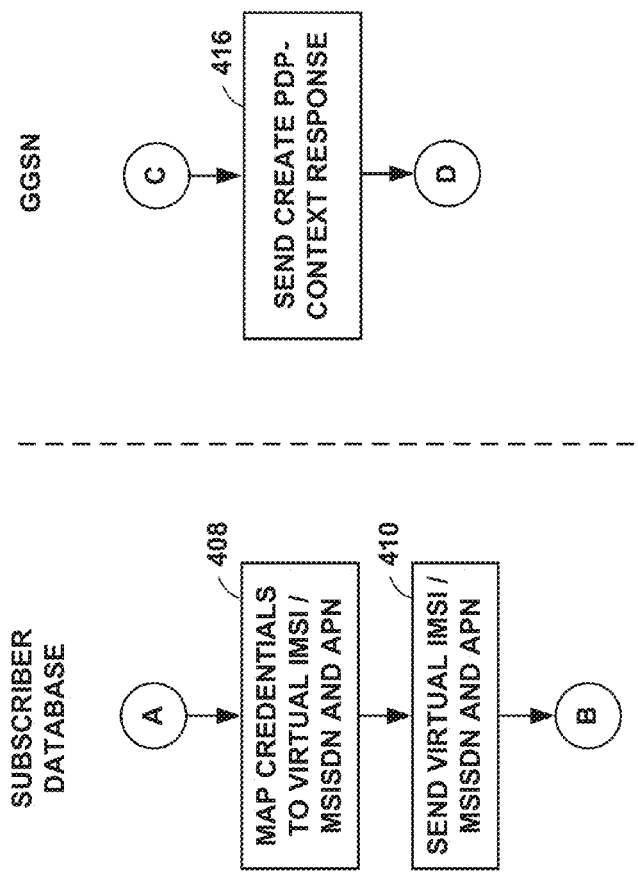

NON-MOBILE AUTHENTICATION FOR MOBILE NETWORK GATEWAY CONNECTIVITY

PRIORITY CLAIM

This application claims the benefit of U.S. Provisional Application No. 61/639,008, filed Apr. 26, 2012, the entire content of which is incorporated herein by reference.

TECHNICAL FIELD

The disclosure relates to mobile networks and, more specifically, to authenticating to mobile networks.

BACKGROUND

Use of wireless devices for accessing computer data networks has recently increased dramatically. These wireless devices provide a platform for both cellular phone calls and cellular-based access to computer data services. For example, a typical cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile service provider network, also "mobile network" or "cellular network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange subscriber data with application or other servers of the PDNs. The increasing number of services available to an increasing number of mobile subscriber devices pressures available mobile network resources.

A mobile network gateway is a service node of the mobile service provider network that operates as a gateway to the PDNs and functions as the anchor point for wireless device mobility. The mobile network gateway applies policy and charging rules to subscriber data traffic between the PDNs and wireless devices to perform charging functionality and manage service connections to ensure an efficient utilization of core, transport, and radio network resources. Different services, such as Internet, E-mail, voice, and multimedia, have different quality of service (QoS) requirements that, moreover, may vary by user.

The ubiquitous use of wireless devices and the ever-increasing desire by users for fast network access from around the world has presented many challenges. For example, the ubiquitous use of cellular wireless devices have placed a high demand for data services over the service provider's mobile network, often straining the mobile network and resulting in delayed or lost data communications. Some wireless devices, in addition to supporting connections to a PDN via a radio interface to the cellular mobile network, also support wireless capabilities to exchange data via an alternate access network (a "non-mobile network") that is separate from the cellular network of the mobile service provider. For example, many wireless devices include a wireless local area network (WLAN) interface that provides data service when in the presences of a WiFi "hotspot" or other wireless access point (WAP). Other examples of such wireless capabilities may include Bluetooth or Near Field Communication (NFC). When in the presence of a WLAN, a user may wish to transition the data services of the wireless to the WLAN so as to accelerate data transmissions, reduce costs, and avoid any delays associated with the mobile service provider network.

SUMMARY

A mobile network typically relies on Subscriber Identity Module (SIM)-based authentication whereby the mobile network receives an International Mobile Subscriber Identity (IMSI) stored on the SIM module of the wireless device to lookup subscriber account information and status, subscribed services, and service level for the subscriber using the wireless device. In general, techniques are described for emulating SIM- or mobile-based authentication methods using alternative subscriber identifiers to establish authenticated connectivity between a mobile service provider gateway and a wireless device attached to an alternate access network.

For example, a wireless access gateway (WAG) of an alternate access network operates as a SaMOG to enable GTP-based connectivity with a mobile network gateway of a mobile network. Using non-mobile authentication methods, a wireless device sends subscriber credentials that do not include an ISMI to the SaMOG-based WAG. The WAG forwards the subscriber credentials to an Authentication, Authorization, and Accounting (AAA) server, which uses the subscriber credentials to query a subscriber database that is not a Home Location Register (HLR) for the mobile network. The subscriber database uses the subscriber credentials to look up and return an IMSI and MSISDN for the subscriber to the AAA server, which forwards the IMSI and MSISDN to the WAG to emulate an HLR-based lookup of subscriber account information. The IMSI and MSISDN may or may not be affiliated with the subscriber in the mobile network HLR.

The WAG sends the IMSI and MSISDN to the mobile network gateway to request a GTP tunnel between the WAG and mobile network gateway. Upon receiving a reply from the mobile network gateway including an end user IP address for the subscriber's wireless device, the WAG creates a packet data protocol (PDP) context to associate an upstream and downstream GTP tunnel between the WAG and the mobile network gateway with the subscriber-facing connection of the alternate access network between the WAG and the wireless device. The WAG uses the PDP context to implement a PDP bearer for a service session between the wireless device and the mobile network gateway, which may then apply mobile policy and charging to subscriber data traffic for the service session.

In some examples, the techniques described herein may enable a mobile service provider to apply policy and charging functionality to subscriber data traffic for a wireless device that attaches to the mobile network gateway using a virtual IMSI, that is, an IMSI that is not obtained from the wireless device SIM. Because some types of non-cellular, alternate access networks do not offer (or prefer not to offer) SIM-based authentication such as EAP-SIM or EAP-AKA, the non-mobile authentication methods that do not require an IMSI may allow a SaMOG-based WAG to nevertheless authenticate a wireless device and establish a GTP-based service session with a mobile network gateway. As a result, the techniques may permit mobile and fixed (i.e., via an alternate access network) subscriber data traffic for a wireless device to converge at the mobile network gateway for unified policy and charging control, in some cases using unmodified Gx, Gy, and Rx interfaces. In some instances, the techniques may also enable IP address preservation for seamless, uninterrupted transitioning by the wireless device between the mobile network and alternate access network.

In one aspect, a method includes receiving, with an authentication server of a mobile service provider network, a network access request for a wireless device from an access gateway of an alternate access network, wherein the network access request does not include an International Mobile Subscriber Identity (IMSI). The method also includes in response to the network access request, obtaining virtual mobility information from a subscriber database for the mobile service provider network, wherein the virtual mobility information comprises a virtual International Mobile Subscriber Identity (IMSI). The method also includes sending the virtual mobility information from the authentication server to the access gateway. The method further includes signaling, with the access gateway using the virtual mobility information, a mobile network gateway of the mobile service provider network to establish a service session for the wireless device over the alternate access network that is anchored by the mobile network gateway.

In another aspect, a method is performed by an access gateway of an alternate access network. The method includes receiving a network access request for a wireless device, wherein the network access request does not include an International Mobile Subscriber Identity (IMSI). The method further includes extracting a wireless device identifier from the network access request and sending the wireless device identifier to an authorization server to request mobility information for the wireless device. The method also includes receiving virtual mobility information for the wireless device and signaling, using the virtual mobility information, a mobile network gateway of the mobile service provider network to establish a service session for the wireless device over the alternate access network that is anchored by the mobile network gateway.

In another aspect, an authentication system of a mobile service provider network includes a Home Location Register, a subscriber database that is separate from the Home Location Register, and an authentication server that receives a network access request for a wireless device from an access gateway of an alternate access network, wherein the network access request does not include an International Mobile Subscriber Identity (IMSI), and wherein the authentication server sends a representation of the network access request to the subscriber database, wherein the subscriber database responds to the representation of the network access request with virtual mobility information, wherein the virtual mobility information comprises a virtual International Mobile Subscriber Identity (IMSI), and wherein the authentication server sends the virtual mobility information to the access gateway.

In another aspect, a non-transitory computer-readable storage medium includes instructions for causing one or more programmable processors of an access gateway of a mobile service provider network to receive a network access request for a wireless device, wherein the network access request does not include an International Mobile Subscriber Identity (IMSI), extract a wireless device identifier from the network access request, and send the wireless device identifier to an authorization server to request mobility information for the wireless device. The instructions further cause the programmable processors to receive, in response to the request, virtual mobility information for the wireless device, wherein the virtual mobility information comprises a virtual International Mobile Subscriber Identity (IMSI), and signal, using the virtual mobility information, a mobile network gateway of the mobile service provider network to establish a service session for the wireless device over the alternate access network that is anchored by the mobile network gateway.

In another aspect, a system includes a mobile service provider network comprising a cellular access network and an alternate access network comprising an access gateway. An authentication server of the mobile service provider network receives a network access request for a wireless device from the access gateway. The system also includes a subscriber database for the mobile service provider network, wherein the subscriber database responds to the network access request with virtual mobility information, wherein the network access request does not include an International Mobile Subscriber Identity (IMSI), and wherein the virtual mobility information comprises a virtual IMSI, and wherein the access gateway uses the virtual mobility information to signal a mobile network gateway of the mobile service provider network to establish a service session for the wireless device over the alternate access network that is anchored by the mobile network gateway.

In another aspect, a method includes emulating a mobile-based authentication method using a subscriber identifier that does not comprise an International Mobile Subscriber Identity (IMSI) to establish authenticated connectivity between a mobile service provider gateway and an access gateway of an alternate access network for a wireless device attached to the alternate access network.

The details of one or more examples are set forth in the accompanying drawings and the description below. Other features, objects, and advantages will be apparent from the description and drawings, and from the claims.

BRIEF DESCRIPTION OF DRAWINGS

FIGS. 2A-2B depict a sequence diagram illustrating an example operation of network devices to perform non-mobile authentication for establishing a service session between a wireless device and a mobile network gateway for accessing services of a PDN, in a manner consistent with techniques described herein.

FIGS. 3A-3B depict a sequence diagram illustrating an example operation of network devices to perform non-mobile authentication for establishing a service session between a wireless device and a mobile network gateway for accessing services of a PDN, in a manner consistent with techniques described herein.

FIGS. 5A-5B depict a sequence diagram illustrating an example operation of a network system in which a subscriber device attaches to a broadband access network, which establishes a service session with a mobile service provider network using non-mobile authentication methods according to aspects of the techniques described herein.

Like reference characters denote like elements throughout the figures and text.

DETAILED DESCRIPTION

Figure 1A:
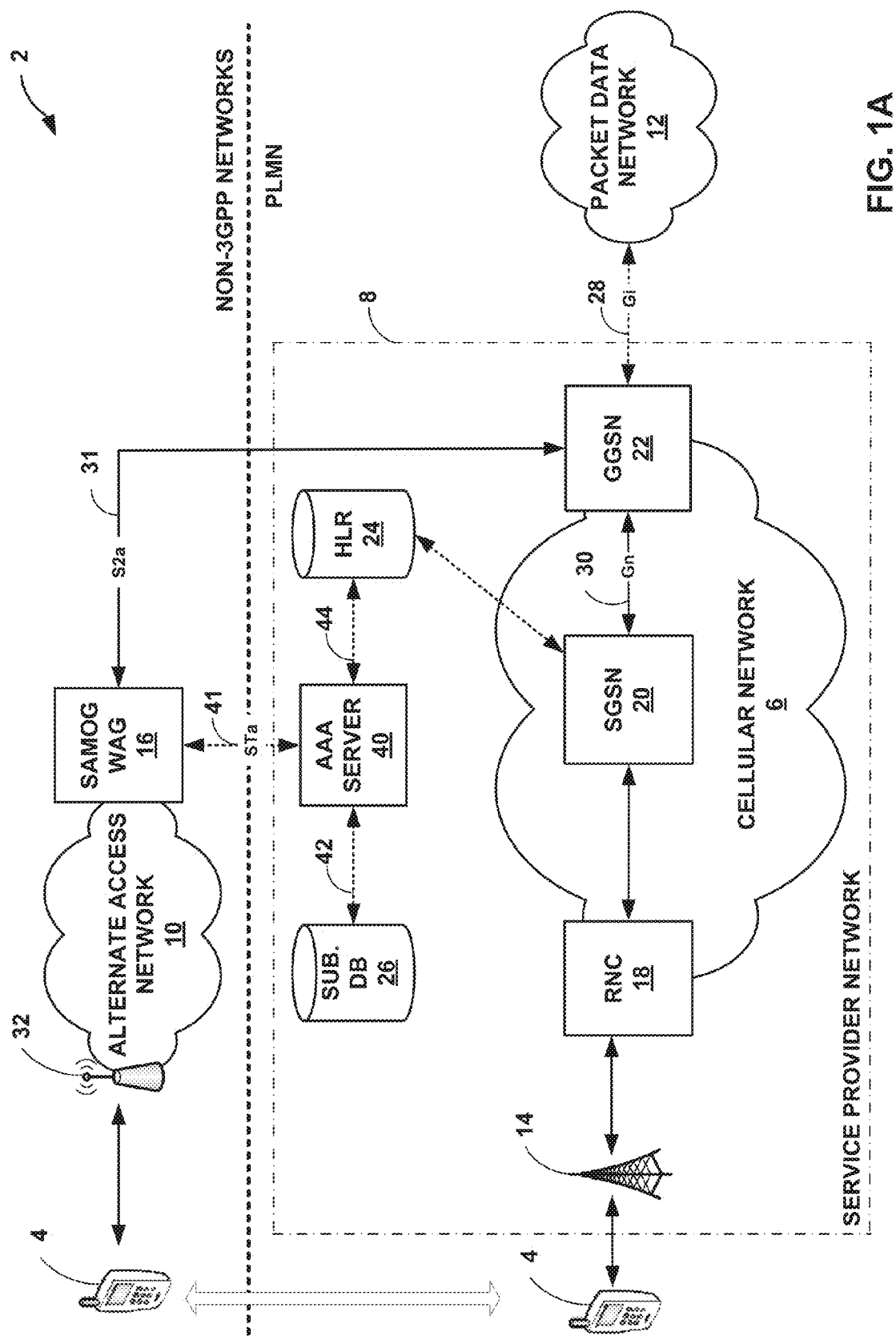
FIGS. 1A-1C are block diagrams illustrating example network systems that include network components operating according to the described techniques.

FIG. 1A is a block diagram illustrating an example network system 2 in which various network components operate in accordance with the described techniques. In the example of FIG. 1A, network system 2 includes network components that provide non-mobile authentication of a wireless device 4 that attaches to an alternate access network 10 outside of a mobile service provider network 8 (hereinafter, "SP network 8"). Network system 2 includes an example SP network 8 having a cellular network 6 that allows data communications between wireless device 4 and a packet data network (PDN) 12, such as the Internet. SP network 8 is an example of a Public Land Mobile Network (PLMN) and, in the illustrated example, may be a Home PLMN for a subscriber associated with wireless device 4.

The techniques of this disclosure allow for establishing connectivity between wireless device 4, when attached to alternate access network 10, and SP network 8 using non-mobile authentication methods. As described in further detail below, the techniques of this disclosure may enable the mobile service provider that operates SP network 8 to apply policy and charging functionality to subscriber data traffic for wireless device 4 using a virtual IMSI, that is, an IMSI that is not obtained from a SIM of wireless device 4.

Wireless device 4 represents any mobile communication device that supports local wireless (e.g., "WiFi") network access, e.g., by way of a wireless LAN interface using any of the IEEE 802.11 communication protocols. Wireless device 4 may optionally support cellular radio access for communication with base station 14 that, in conjunction with radio network controller (RNC) 18, represents a radio access network of SP network 8. Wireless device 4 may represent, for example, a mobile telephone; a laptop, tablet, or other mobile computer optionally including, e.g., a 3G/4G wireless card; a smart phone; or a personal data assistant (PDA) having WLAN communication and optional cellular communication capabilities. Wireless device 4 may run one or more software applications, such as VoIP clients, video games, videoconferencing, E-mail, and Internet browsers, among others. PDN 12 supports one or more packet-based services that are available for request and use by wireless device 4. Certain applications running on wireless device 4 may require access to services offered by PDN 12, such as mobile calls, video games, videoconferencing, and email, among others. Wireless device 4 may also be referred to, in various architectural instances, as a User Equipment (UE) or a mobile station (MS). One example of a wireless device is described in U.S. patent application Ser. No. 12/967,977, filed Dec. 14, 2010, and entitled "MULTI-SERVICE VPN NETWORK CLIENT FOR WIRELESS DEVICE," incorporated herein by reference. Wireless device 4 may optionally store a unique identifier such as an International Mobile Subscriber Identity (IMSI) or an International Mobile Equipment Identity (IMEI) stored, for instance, in a subscriber identity module (SIM) or in a memory or integrated circuit of wireless device 4.

A service provider operates SP network 8 to provide network access, data transport and other services to wireless device 4. SP network 8 includes base station 14 and cellular network 6. In some instances, SP network 8 includes PDN 12 that, in such instances, offers service provider IP services such as IP Multimedia Subsystem (IMS), Packet Switch Streaming (PSS), and/or Multimedia Broadcast/Multicast Service (MBMS) User Service. Wireless device 4 may communicate with base station 14 over wireless links to access SP network 8.

The service provider provisions and operates cellular network 6 to provide network access, data transport and other services to cellular mobile devices, which may include wireless device 4. In general, cellular network 6 may implement any commonly defined cellular network architecture including those defined by standards bodies, such as the Global System for Mobile communication (GSM) Association, the $3^{rd}$ Generation Partnership Project (3GPP), the $3^{rd}$ Generation Partnership Project 2 (3GPP/2), the Internet Engineering Task Force (IETF), and the Worldwide Interoperability for Microwave Access (WiMAX) forum. For example, cellular network 6 may represent one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Cellular network 6 may, alternatively or in conjunction with one of the above, implement a code division multiple access-2000 ("CDMA2000") architecture. Cellular network 6 may, again as an alternative or in conjunction with one or more of the above, implement a WiMAX architecture defined by the WiMAX forum.

In the example of FIG. 1A, SP network 8 includes a Universal Mobile Telephony Service (UMTS) network that operates in accordance with 3rd Generation Partnership Project (3GPP) standards and with the techniques described herein. For purposes of illustration, the techniques herein will be described with respect to a UMTS network. However, the techniques are applicable to other communication network types in other examples. For instance, the techniques are similarly applicable to network architectures and nodes deploying 3GPP/2, LTE, CDMA2000, WiMAX, and Mobile IP based technologies and standards.

In this example, cellular network 6 includes radio network controller (RNC) 18 coupled to base station 14. RNC 18 and base station 14 may provide wireless access by wireless device 4 to cellular network 6. Base station 14 may be a Node B base transceiver station that uses an air interface to communicate with user equipment in the geographic region (or "cell") that base station 14 serves. In some examples, base station 14 is a femtocell. Wireless device 4 may be located within the cell served by base station 14. SP network 8 may, in some instances, include additional base stations, each of which may serve one of several cells. In some examples, base station 14 may be another type of wireless transceiver station, such as a site controller or a WiMAX access point.

In the illustrated instance, cellular network 6 includes serving GPRS support node 20 ("SGSN 20"), and gateway GPRS support node 22 ("GGSN 22"). SGSN 20 switches mobile traffic to available GGSNs, such as GGSN 22. Cellular network 6 also includes RNC 18, which manages and routes data to/from base station 14 to SGSN 20. RNC 18 may establish and support GTP tunnels to SGSN 20. In some instances, RNC 18 comprises an IP router. In some instances, SP network 8 may include additional RNCs and associated base stations variously arranged. In instances where SP network 8 includes an LTE network, an eNode B, Serving Gateway (SGW), and PDN Gateway (PGW) perform the functionality of the elements of SP network 8 in the illustrated instance.

SGSN 20 and GGSN 22 provide packet-switched (PS) services to RNC 18. For example, SGSN 20 and GGSN 22 provide packet routing and switching, as well as mobility management, authentication, and session management for wireless device 4 served by RNC 18. The packet-switched services provided by SGSN 20 and GGSN 22 may include mobility services, such as authentication and roaming services, as well as call handling services, signaling, billing, and internetworking between cellular network 6 and external networks, such as PDN 12. For example, SGSN 20 serves RNC 18. Wireless device 4 may connect to SGSN 20, sending identifying credentials from the SIM card inside wireless device 4 (e.g., an IMSI) to SGSN 20 via RNC 18, which SGSN 20 uses to authenticate the wireless device in cooperation with Home Location Register (HLR) 24. In some examples, as illustrated, HLR 24 may be connected to AAA server 40.

GGSN 22 is a mobile network gateway that connects cellular network 6 to PDN 12 via Gi interface 28 operating over a physical communication link (not shown). SGSN 10 obtains upstream data traffic from RNC 18, e.g., traffic initiated by wireless device 4, and routes the data traffic to GGSN 22. GGSN 22 decapsulates the data traffic, and initiates IP traffic on Gi interface 28 toward PDN 12. Similarly, GGSN 22 may receive IP traffic destined for wireless device 4 on Gi interface 28, encapsulates the IP for transport in a GPRS Tunneling Protocol (GTP) tunnel, and sends the encapsulated traffic downstream to SGSN 10 on Gn interface 30A. GGSN 22 enables access to one or more services provided by servers via PDN 12, and GGSN 22 maps accessible services to access points.

In some situations, a subscriber associated with wireless device 4 may wish to receive data services via alternate access network 10 instead cellular network 6 of SP network 8. Alternate access network 10 is considered by SP network 8 as a trusted non-3GPP access network and may represent, for example, a WLAN or Wi-Fi network. In the example of FIG. 1A, alternate access network 10 includes access point 32, to which wireless device 4 can attach in order to access the services available through PDN 12. Alternate access network 10 also includes SaMOG-based wireless (or Wi-Fi) access gateway 16 (illustrated as and referred to hereinafter as "SaMOG WAG 16") that interfaces to GGSN 22 and AAA server 40 of SP network 8 to provide wireless device 4 with authenticated access to SP network 8.

In the illustrated example, SaMOG WAG 16 interfaces to GGSN 22 and AAA server 40 by S2a interface 31 and STa interface 41, respectively. STa interface 41 (also referred to as an STa reference point) connects alternate access network 10 with AAA server 41 and transports access authentication, authorization, and optionally mobility parameters and charging-related information. S2a interface 31 and STa interface 41 may operate over a backhaul IP network connecting SaMOG WAG 16 and GGSN 22. SaMOG WAG 16 may thus incorporate and perform both the Trusted WLAN AAA Proxy (TWAP) and Trusted WLAN Access Gateway (TWAG) functions for alternate access network 10.

S2a interface 31 is GTP-based or Proxy Mobile IP (PMIP)-based interface and is thus similar to a Gn interface of a UMTS network (e.g., Gn interface 30) or to an S5/S8 interface of an LTE network. S2a interface 31 is described hereinafter as GTP-based. SaMOG techniques are described further in "Study on S2a Mobility based On GTP & WLAN access to EPC (SaMOG)," 3rd Generation Partnership Project, Technical Specification Group Services and System Aspects, Stage 2 (Release 11), which is incorporated by reference in its entirety herein. The techniques of this disclosure allow for non-mobile authentication by SaMOG WAG 16, in cooperation with AAA server 40 and subscriber database 26, of wireless device 4 attached to alternate access network 10 when establishing, SaMOG WAG 16, an IP-based connection between wireless device 4 and GGSN 22 of SP network 8. These techniques may in some cases be applied with no changes required to HLR 24 or devices of cellular network 6.

Figure 1B:
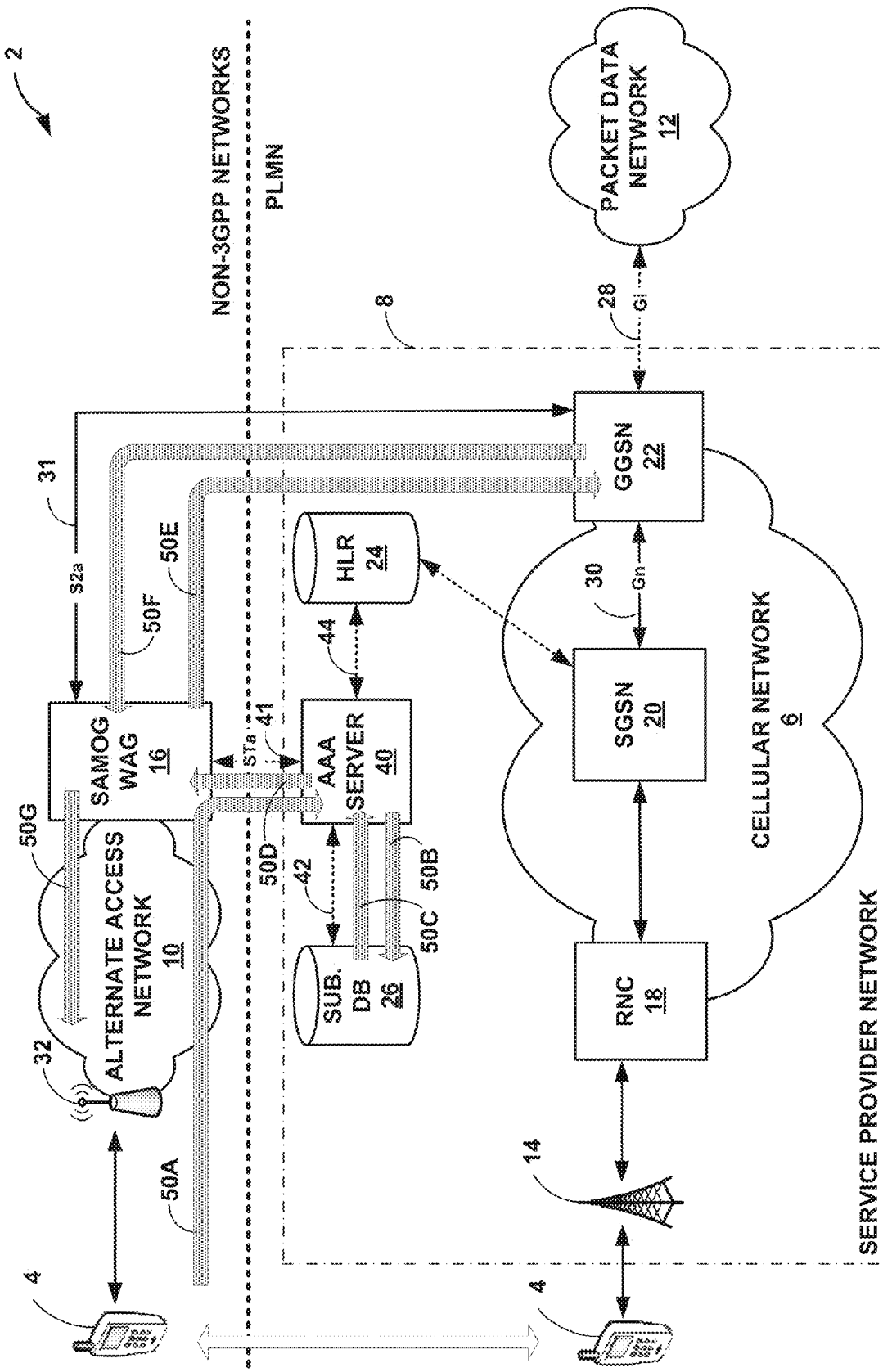

FIG. 1B illustrates elements of network system 2 exchanging control information to authenticate wireless device 4 attached to alternate access network 10 for establishing a service session that carries subscriber data traffic between wireless device 4 and GGSN 22 via alternate access network 10. In accordance with techniques of this disclosure, wireless device 4 sends message 50A as a network access request having subscriber credentials or a wireless device 4 identifier, which to do not include an IMSI for wireless device 4, to SaMOG WAG 16. SaMOG WAG 16 forwards a representation of the network access request, i.e. message 50A, to AAA server 40.

AAA server 40 is a device that receives and processes connections requests for SP network 12. As illustrated and described with respect to FIGS. 2-6, message 50A received by AAA server 40 may represent a RADIUS protocol Access-Request, Authentication-Request, or a corresponding Diameter request, containing subscriber credentials or wireless device 4 identifier such as the subscriber username and password, a wireless device 4 layer two (L2) MAC address, or an Extensible Authentication Protocol identifier. In the illustrated example, AAA server 40 outsources some AAA functionality to subscriber database 26. Subscriber database 26 represents a non-HLR device, such as a Structured Query Language or Lightweight Directory Access Protocol (LDAP) database server, that stores and/or generates mobile information used by elements of network system 2 to establish a service session to carry subscriber data traffic between wireless device 4 and GGSN 22. In some instances, aspects of subscriber database 26 functionality may be integrated with AAA server 40. Although subscriber database 26 represents a non-HLR device, subscriber database 26 may in some instances be integrated within a multi-function device that performs HLR functionality. Subscriber database 26 may, for example, implements additional authentication and address preservation techniques, as described with respect to a subscriber database in U.S. patent application Ser. No. 13/247,357, incorporated below, and in U.S. patent application Ser. No. 13/247,308, entitled "CREDENTIAL GENERATION FOR AUTOMATIC AUTHENTICATION ON WIRELESS ACCESS NETWORK," filed Sep. 28, 2011, which is incorporated herein by reference in its entirety.

As illustrated and described in further detail below with respect to FIGS. 2-5, mobile subscriber information may include IMSIs, MSISDNs, "virtual" IMSIs, "virtual" MSISDNs, subscriber credentials (e.g., a usernames and passwords), a default APN for the service session, and IP addresses, for example. Subscribers may be "true subscribers," in that the subscribers have a pre-existing subscription to SP network 8 services, or "virtual subscribers" of SP network 8, in that the subscribers are accessing SP network 8 on an ad-hoc basis. An MSISDN number (also referred to herein as simply "MSISDN") is sometimes expanded to refer to a "Mobile Subscriber Integrated Services Digital Network Number" or "Mobile Station Integrated Services Digital Network Number."

Because AAA server 40 does not have an IMSI for wireless device 4, rather than querying HLR 24 of SP network 8, AAA server 40 queries subscriber database 26 with message 50B. Message 50B which may include any of the subscriber credentials or wireless device 4 identifier received in message 50A. As illustrated and described in further detail below with respect to FIGS. 2-6, subscriber database 26 uses message 50A to lookup or generate mobile information for wireless device 4, which subscriber database 26 returns to AAA server 40 in message 50C. In this way, subscriber database 26 returns virtual mobility information, in the form of an IMSI and MSISDN that appear to SaMOG WAG 16 to represent a given subscriber but that may in fact be unaffiliated with wireless device 6. In other words, subscriber database 26 fakes the mobility information to allow SaMOG WAG 16 to establish the service session with GGSN 22 to enable centralized policy and charging control using, e.g., a Policy Charging and Rules Function (PCRF) entity. In some instances, wireless device 4 may have access to IMSI but not to the cryptographic vectors on the SIM card because authentication in no EAP-SIM or EAP-AKA based. In such instances, wireless device 4 may obtain and send the IMSI of its SIM card as a subscriber credential rather than username, although authentication itself is still based on a password in accordance with the techniques described herein.

AAA server 40 returns message 50D to SaMOG WAG 16. Message 50D is in reply to message 50A and may represent a RADIUS Access-Accept, Authorization-Accept, or corresponding Diameter message. Message 50D may include some or all of the mobile information received by AAA server in message 50C.

Upon receiving message 50D, SaMOG WAG 16 issues create session request message 50E to GGSN 22. Create session request message 50E includes an IMSI and an MSISDN queried or generated by subscriber database 26. In the illustrated instance, session request message 50E represents a Create PDP-Context Request message. In instances where cellular network 6 represents an LTE network Evolved Packet Core (EPC), create session request message 50E represents a Create Session Request message.

GGSN 22 receives create session request message 50E and establishes a subscriber session for wireless device 4 by executing control protocols to receive PDP address configuration and communicate with SaMOG WAG 16 to establish bearers to carry subscriber data traffic (alternatively referred to as "service traffic," "subscriber traffic," or "user traffic") for the service session with wireless device 4, among other operations. In particular, GGSN 22 sends create session response message 50F to SaMOG WAG 16. Create session reply message 50F may represent a Create PDP-Context Reply (UMTS) or Create Session Response (LTE) message. GTP tunnel identifiers (TEIDs) in create session request message 50E and create session response message 50F define a GTP-U(ser data) tunnel over S2a interface 31. The GTP-U tunnel carries upstream and downstream service traffic (alternatively referred to as "subscriber data traffic," "subscriber traffic," or "user traffic") between GGSN 22 and wireless device 4.

Figure 1C:
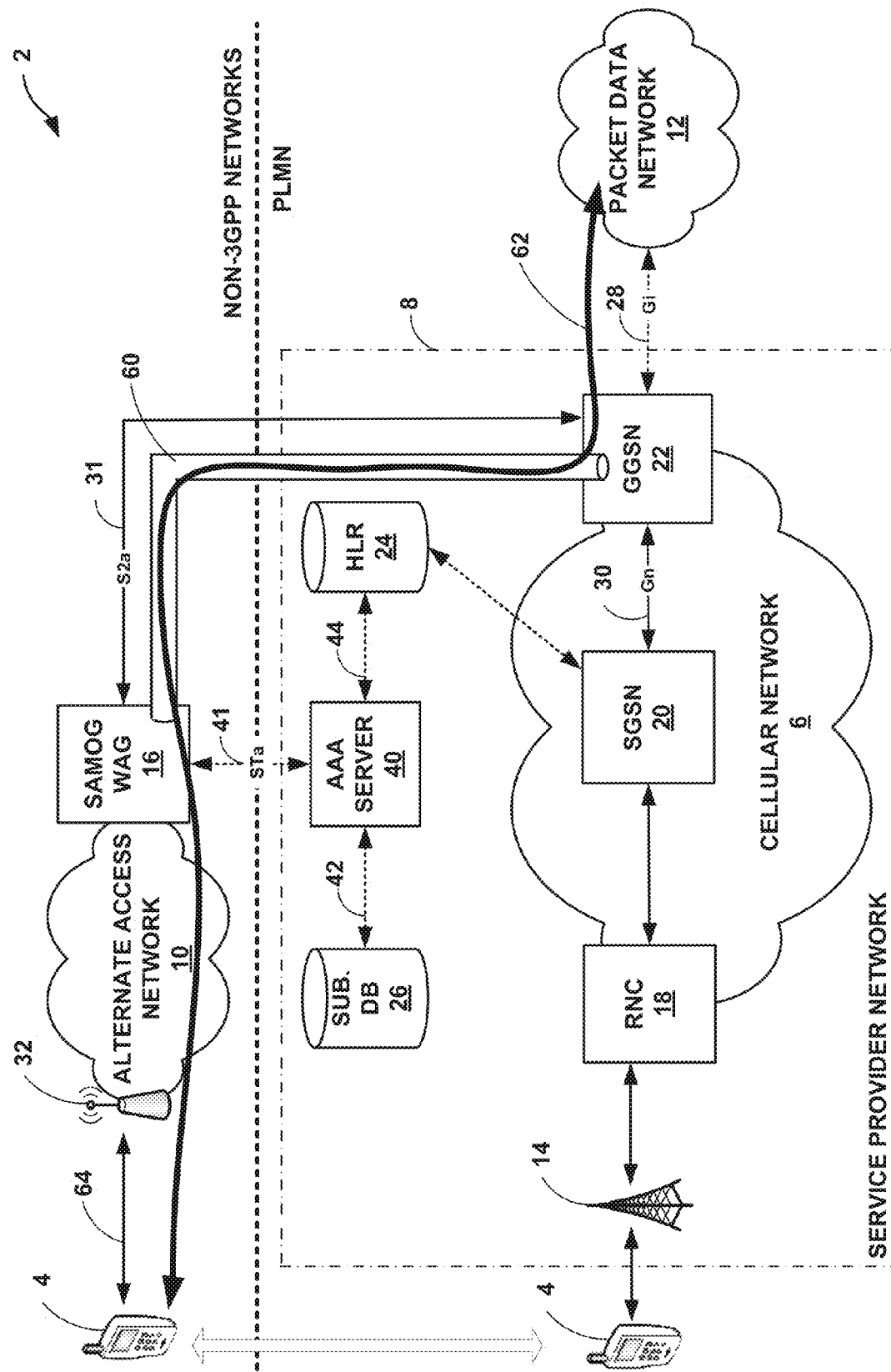

FIG. 1C illustrates a GTP-U tunnel 60 established by elements network system 2 using non-mobile authentication methods consistent with techniques described in this disclosure. Wireless device 4 exchanges service data traffic 62 with PDN 12 by wireless link 64 with access point 32, alternate access network 10, and GTP-U tunnel 60.

Figure 2A:
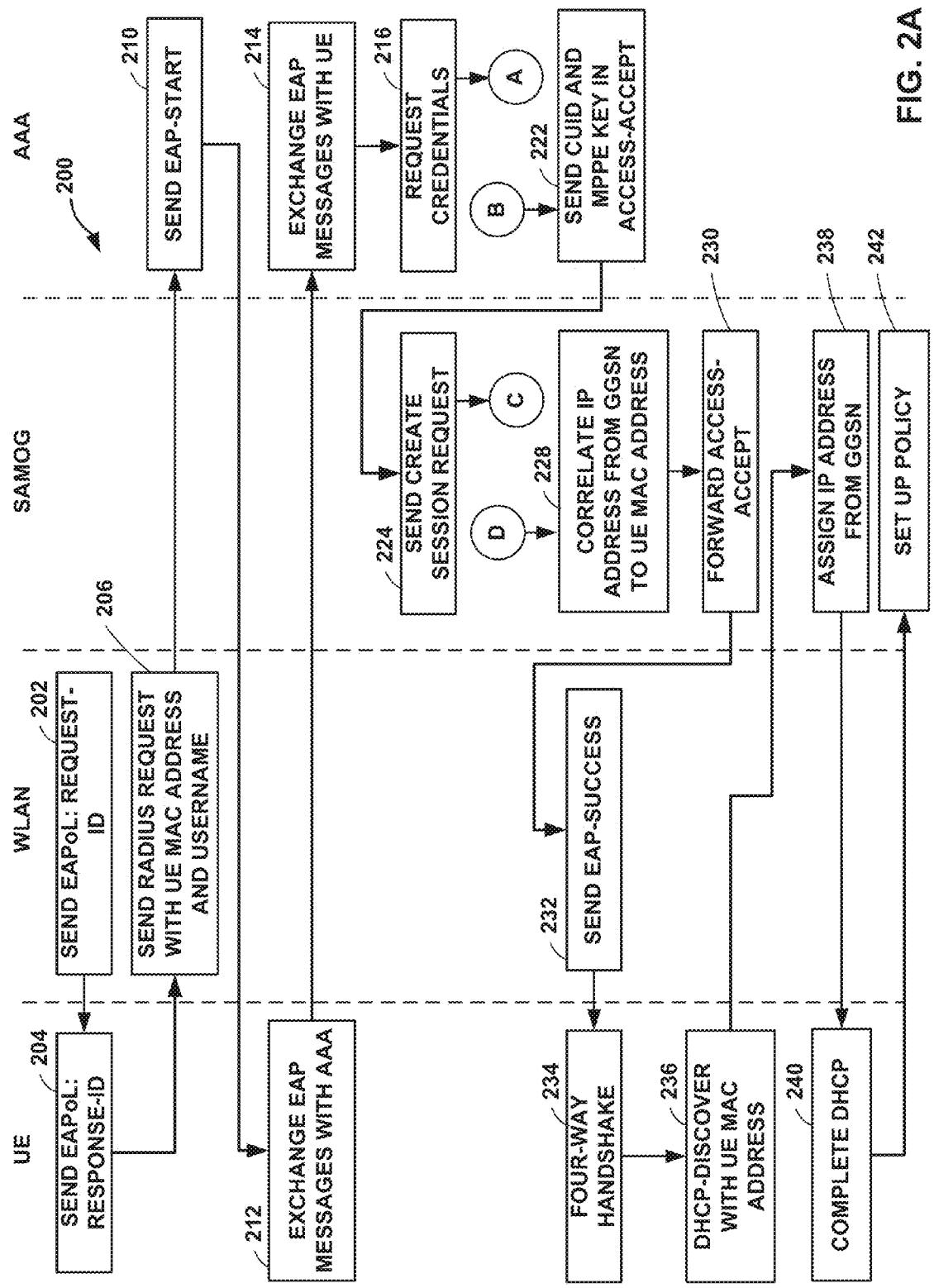

FIGS. 2A-2B depict a sequence diagram 200 illustrating an example operation of network devices to perform non-mobile authentication for establishing a service session between wireless device 4 and GGSN 22 for accessing services of a PDN, in a manner consistent with techniques described herein. Sequence diagram 200 incorporates a "subscriber database" that is non-HLR-based (e.g., subscriber database 26) and that manages subscribers in accordance with techniques of this disclosure.

In some examples, subscriber database 26 obtains mobility information (e.g., IMSI/MSISDN values) for subscribers from HLR 24 and associates respective mobility information with subscriber credentials (e.g., usernames/passwords). In such examples, when wireless device 4 attempts to authenticate with subscriber credentials to SaMOG WAG 16, AAA server 40 uses the subscriber credentials to look up the mobility information. SaMOG WAG 16 may then use the actual mobility information for the "true subscriber" to establish a service session with GGSN 22 for accessing PDN 12 services. In this respect, these examples provide a real 1:1 mapping between HLR 24 and subscriber database 26.

In some examples, HLR 24 defines a range of IMSIs that are not used by HLR 24. Instead, subscriber database 24 allocates these "free" IMSIs to wireless devices attempting to establish service sessions to PDN 12 via SaMOG WAG 16. Wireless device 4 in this case may not include a SIM card, and wireless device 4 may not send subscriber credentials to SaMOG WAG 16 during authentication. A particular MSISDN may be associated with/used by a true subscriber in HLR 24, which means GGSN 22 would apply charging/billing to the true subscriber, though a different IMSI would be used. Alternatively, a particular MSISDN may not be located in HLR 24 and therefore charging/billing may be applied only temporarily for the service session. As a result, wireless device 4 may not receive access to premium services.

In some examples, IMSI/MSISDNs are dynamic and therefore temporary, and IMSI/MSISDN mapping is based on a per connection/authentication basis. However, a user of wireless device 4 may provide a credit card number or other charging identifier during authentication so the service provider may charge for the service session and/or service data traffic using the service session. The above subscriber management examples may be used in the alternative or in any combination for all subscribers or any subset thereof.

Sequence diagram 200 illustrates the techniques when subscriber database 26 maps subscriber credentials, in this case a username and password, to a virtual IMSI/MSISDN pair for use in GTP-C signaling. The example of FIG. 2 illustrates operation of User Equipment (UE) (e.g., an instance of wireless device 4 having a SIM card), a WLAN (e.g., alternate access network 10, in particular, access point 32), SaMOG WAG 16, AAA server 40, HLR 24, and GGSN 22. As shown in FIG. 2, wireless device 4 in conjunction with access point 32 perform EAP-based authentication to AAA server 40 initialized with a RADIUS Access-Request. The network elements may use a form of EAP, such as EAP-TTLS or PEAP, as part of WLAN 802.1x authentication.

Sequence diagram 200 illustrates the techniques in the context of WLAN 802.1x Authentication, which may include EAP-TTLS or PEAP. In examples that operate according to sequence diagram 200, as described above, subscriber credentials and mobility information may be derived and pre-populated in subscriber database 26. The mobility information may or may not be related to true or existing subscribers in HLR 24. In addition, in these examples, subscriber database 26 may signal individual (i.e., non-default) APNs for incoming session requests.

Initially, access point 32 requests wireless device 4 identify itself with an EAP over LAN (EAPoL) Request Identity frame (202). Wireless device 4 response with an EAP Response Identity frame containing an identifier for wireless device 4 (e.g., a username) (204). Access point 32 encapsulates the identifier in a RADIUS Access-Request message and sends the message, which is encapsulated in an L2 frame that includes the UE MAC address, to AAA server 40 via SaMOG WAG 16 (202). At this point, SaMOG 16 knows the UE MAC address of wireless device 4 from the L2 frame header.

AAA server 40 issues an EAP start message to wireless device 4 (210), which prompts an exchange of additional EAP messages between wireless device 4 (212) and AAA server 40 (214). AAA 40 server requests additional credentials for wireless device 4 from subscriber database 26 (pre-populated in subscriber database 26 prior to authentication) based on the identifier for wireless device 4 (216).

Subscriber database 26 maps the username to a password (together, the "subscriber credentials"), and subscriber 26 maps the subscriber credentials to a "virtual" IMSI/MSISDN, which may or may not represent the IMSI/MSISDN for the true subscriber associated with the subscriber credentials (218). Subscriber database 26 returns the virtual IMSI/MSISDN and optionally an APN to AAA server 40 (220), which forwards them to SaMOG WAG 16 in a RADIUS Access-Accept message that includes a ChargeableUserID (CUID) made up of the IMSI/MSISDN and (optionally) that APN as well as a derived Primary Master Key (PMK) as an encryption key (e.g., a Microsoft Point-to-Point Encryption (MPPE) key) (222). To establish a service session including a GTP-U tunnel for a service (which may be identified in the Create PDP-Context Request message by the optional APN or a default APN), SaMOG WAG 16 uses GTP-C signaling and sends a Create PDP-Context Request message to GGSN 22 (224), which responds with a Create PDP-Context Response message (226). In the context of an LTE architecture, GTP-C signaling may use Create Session Response/Request messages between SaMOG WAG 16 and PGW.

SaMOG WAG 16 stores an association between the UE MAC address and the IP address returned in the Create PDP-Context Response message (228). SaMOG WAG 16 additionally forwards the RADIUS Access-Accept message to access point 32, which sends an EAP success message (232) and performs the EAP four-way handshake with wireless device 4 (234).

Wireless device 4 may then obtain the IP address assigned by GGSN 22. In this example, wireless device 4 issues a Dynamic Host Configuration Protocol (DHCP)-Discover message using the UE MAC address to SaMOG WAG 16 (236), which reads the stored association between the UE MAC address and the IP address returned in the Create PDP-Context Response message and returns the IP address to wireless device 4. SaMOG WAG 16 and wireless device 4 complete the DHCP process to complete the connection and establish IP connectivity (240). In addition, SaMOG WAG 16 may establish a policy in its forwarding or data plane that identifies traffic received from the IP address for wireless device 4 and forwards the traffic to GGSN on the GTP-U tunnel 60 for the service session (242). SaMOG WAG 16 may create a similar policy for downstream subscriber data traffic.

Figure 3A:
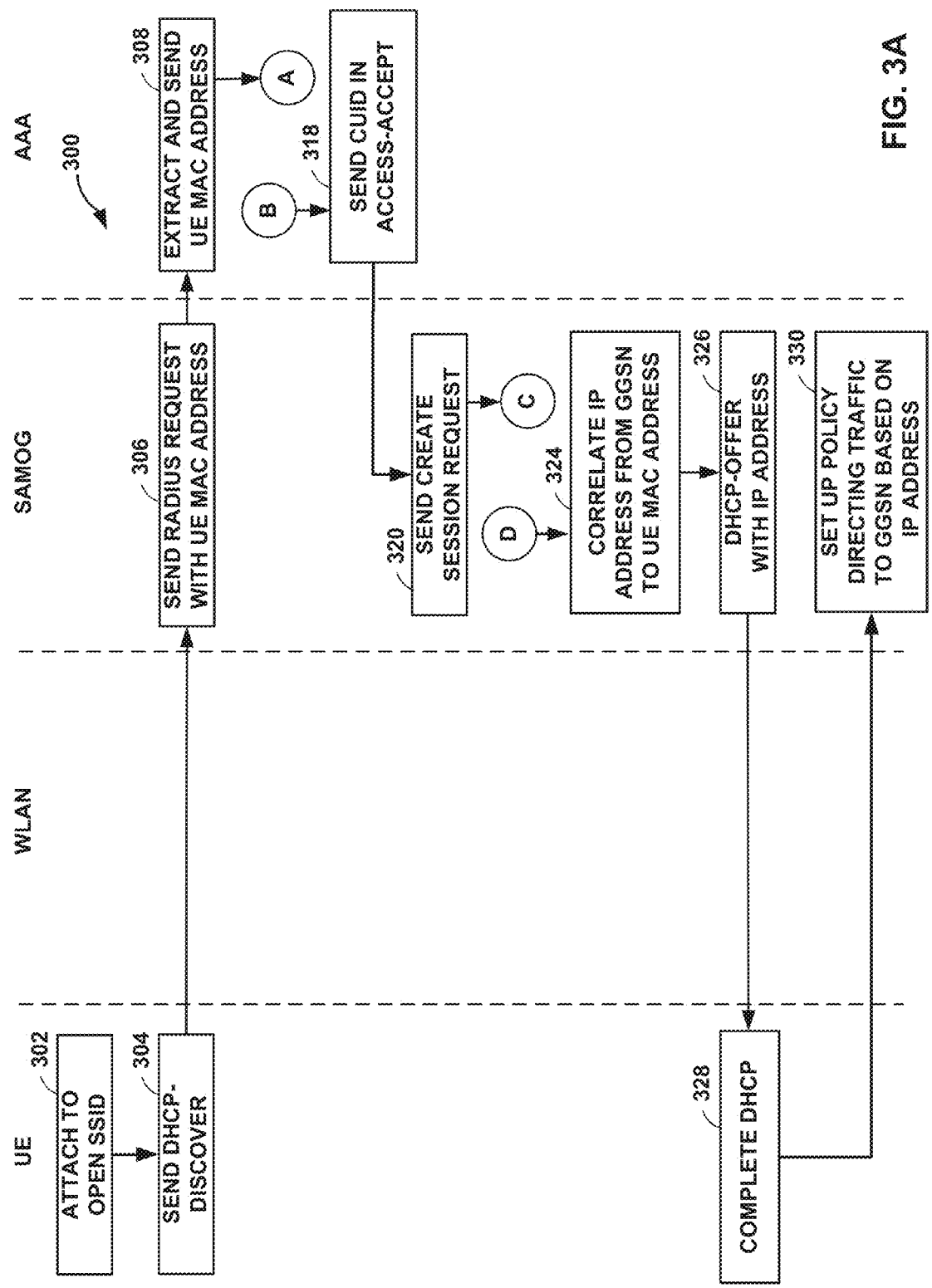

FIGS. 3A-3B depict a sequence diagram 300 illustrating an example operation of network devices to perform non-mobile authentication for establishing a service session between wireless device 4 and GGSN 22 for accessing services of a PDN, in a manner consistent with techniques described herein. Sequence diagram 300 illustrates the techniques using DHCP based on a UE MAC address when SaMOG WAG 16 does not receive subscriber credentials from wireless device 4. That is, wireless device 4 first attaches to access point 32 to open the SSID (302), and then SaMOG WAG 16 establishes a service session upon detecting a new MAC address of wireless device 4 ("UE MAC Address") associated with a subscriber in a DHCP-Discover message (304), which is encapsulated in an L2 frame that includes the UE MAC address. At this point, SaMOG 16 knows the UE MAC address of wireless device 4 from the L2 frame header.

SaMOG WAG 16 issues a RADIUS Access-Request message to AAA server 40 with the MAC address (306), which queries subscriber database 26 to select mobility information for the MAC address (308). If the MAC address new to the subscriber database 26 (NO branch of 310), subscriber database 26 may associate a free IMSI/MSISDN and optionally an APN with the MAC address (312). Subscriber database 26 not only returns the mobility information to AAA server 40, subscriber database 26 also associates the mobility information with the MAC address and stores the association in a table or other data structure (312). If the MAC address has been previously stored in this way (YES branch of 310), subscriber database 26 may use the MAC address to look up the associated mobility information to return to AAA server 40 (314). Subscriber database 28 returns the IMSI/MSISDN and optionally an APN to AAA server 40 (316), which forwards them to SaMOG WAG 16 in a RADIUS Access-Accept message that includes a ChargeableUserID (CUID) made up of the IMSI/MSISDN and (optionally) the APN (318). To establish a service session including a GTP-U tunnel for a service (which may be identified in the Create PDP-Context Request message by the optional APN or a default APN), SaMOG WAG 16 uses GTP-C signaling and sends a Create PDP-Context Request message to GGSN 22 (320), which responds with a Create PDP-Context Response message (322). In the context of an LTE architecture, GTP-C signaling may use Create Session Response/Request messages between SaMOG WAG 16 and PGW.

SaMOG WAG 16 stores an association between the UE MAC address and the IP address returned in the Create PDP-Context Response message (324). SaMOG WAG 16 initiates DHCP in this aspect by issuing a DHCP-Offer to wireless device 4 with the IP address assigned by GGSN 22 (326). SaMOG WAG 16 and wireless device 4 complete the DHCP process to complete the connection and establish IP connectivity (328). In addition, SaMOG WAG 16 establishes a policy in its forwarding or data plane that identifies traffic received from the IP address for wireless device 4 and forwards the traffic to GGSN on the GTP-U tunnel 60 for the service session (330). SaMOG WAG 16 may create a similar policy for downstream subscriber data traffic.

Figure 4:
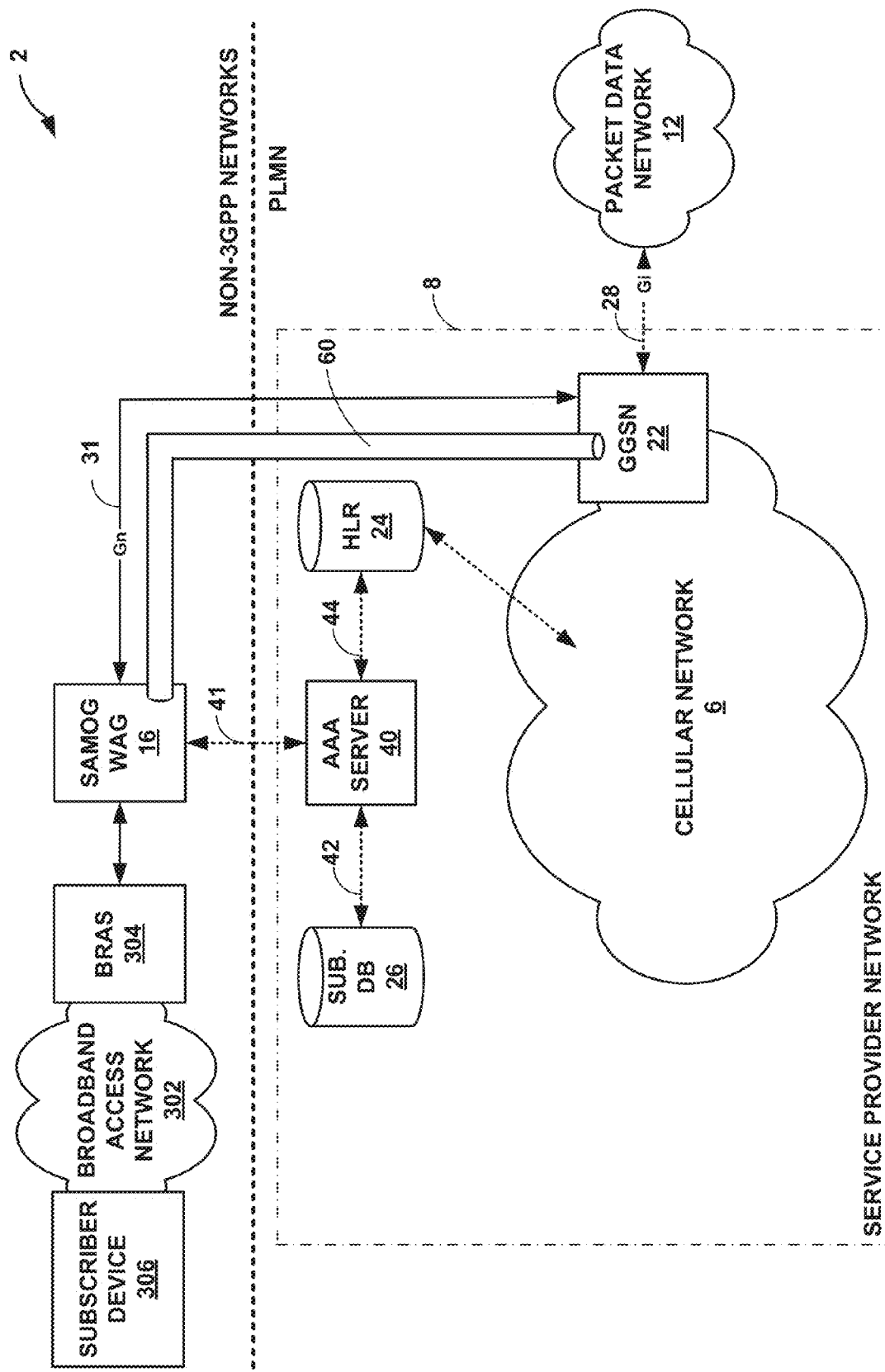
FIG. 4 is a block diagram illustrating an example network system in which a subscriber device attaches to a broadband access network, which establishes a service session with a mobile service provider network using non-mobile authentication methods in accordance with techniques described herein.

FIG. 4 is a block diagram illustrating an example network system in which a subscriber device attaches to a broadband access network, which establishes a service session with a mobile service provider network using non-mobile authentication methods in accordance with techniques described herein. In this example of network system 2, alternate access network 10 is replaced with a wireline broadband access network (BAN) 302. Subscriber device 306 may represent an example of wireless device 4 of FIGS. 1A-1C as well as wired devices/customer premises equipment (CPE), such as a computer, television set-top box, video-gaming system, conferencing system, or a Digital Subscriber Line (DSL) or Cable Modem.

Subscriber device 306 attaches to Broadband Remote Access Server (BRAS) 304 over BAN 302, which may represent a DSL or Cable Modem Termination System (CMTS) network, for instance. As one example, subscriber device 306 may establish a Point-to-Point Protocol (PPP) session with BRAS 304, a layer three (L3) device. BRAS 304 is coupled to SaMOG WAG 16, which obtains subscriber credentials for subscriber device 306 and applies techniques described herein in conjunction with other elements of network system 2 to establish a service session with SP network 8. In some examples, elements of network system 2 operate according to sequence diagram 400 to establish the service session. As a result, the service provider operating SP network 8 may apply unified policy and charging control to subscriber data traffic exchanged with wireline BAN 302. In some examples, BAN 302 and BRAS 304 may represent L2 network devices, such as a Metro Ethernet Network and an access switch. An example Metro Ethernet Network and access switch for connecting to a mobile service provider network are described in U.S. patent application Ser. No. 13/247,357, filed Sep. 28, 2011, and entitled "NETWORK ADDRESS PRESERVATION IN MOBILE NETWORKS," which is incorporated by reference herein in its entirety.

FIGS. 5A-5B depict a sequence diagram 400 illustrating an example operation of network devices to perform non-mobile authentication for establishing a service session between a subscriber device 306 ("UE") and GGSN 22 of FIG. 4 for accessing services of a PDN, in a manner consistent with techniques described herein. In examples that operate according to sequence diagram 400, as described above, subscriber credentials and mobility information may be derived and pre-populated in subscriber database 26. The mobility information may or may not be related to true or existing subscribers in HLR 24. In addition, in these examples, subscriber database 26 may signal individual (i.e., non-default) APNs for incoming session requests.

Initially, wireless device 4 initiates PPP authentication (402). For example, wireless device 4 may send a Point-to-Point Protocol (PPP) Link Control Protocol (LCP) frame for Password Authentication Protocol (PAP) or Challenge Handshake Authentication Protocol (CHAP). BRAS 304, having obtained a username and password ("subscriber credentials") from wireless device 4 during PPP authentication initiation, issues a RADIUS Access-Request having the subscriber credentials toward SaMOG WAG 16, which forwards the RADIUS Access-Request to AAA server 40 (404).

AAA server 40 queries subscriber database 26 with the credentials (406). Subscriber database 26 maps the subscriber credentials to a "virtual" IMSI/MSISDN, which may or may not represent the IMSI/MSISDN for the true subscriber associated with the subscriber credentials (408). Subscriber database 26 returns the virtual IMSI/MSISDN and optionally an APN to AAA server 40 (410), which forwards them to SaMOG WAG 16 in a RADIUS Access-Accept message that includes a ChargeableUserID (CUID) made up of the IMSI/MSISDN and (optionally) the APN (412). To establish a service session including a GTP-U tunnel for a service (which may be identified in the Create PDP-Context Request message by the optional APN or a default APN), SaMOG WAG 16 uses GTP-C signaling and sends a Create PDP-Context Request message to GGSN 22 (414), which responds with a Create PDP-Context Response message (416). In the context of an LTE architecture, GTP-C signaling may use Create Session Response/Request messages between SaMOG WAG 16 and PGW.

SaMOG WAG 16 forwards the IP address received in the Create PDP-Context Response message in a RADIUS Access-Accept message to BRAS 304. BRAS 304 sends a PPP Acknowledge message (422) and wireless device 4 and BRAS 304 complete the PPP session establishment process such that wireless device 4 receives the IP address for the service session (424). In addition, SaMOG WAG 16 creates a policy to direct traffic to GGSN 22 by the new GTP-U tunnel for the service session based on a Framed-IP-Address for the subscriber data traffic in BAN 302 (428). SaMOG WAG 16 may create a similar policy for downstream subscriber data traffic.

An approach similar to that illustrated by sequence diagram 400 may be used to manage client based Virtual Private Networking (VPN)-Tunnels. In such instances, a VPN concentrator replaces BRAS 304 and SaMOG WAG 16 opens a Secure Socket Layer (SSL) VPN tunnel or IPsec tunnel from wireless device 4 toward the VPN concentrator. SaMOG WAG receives the framed IP address and assigns the IP address to wireless device 4. At this point, a data tunnel for the service session piggybacks on the VPN tunnel. Thus, instead of using PPP-based authentication, the techniques are similarly applicable to the non-mobile-based username/password-based authentication method for setting up VPN tunnels.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

What is claimed is:

1. A method comprising:
   receiving, with an authentication server of a mobile service provider network, a network access request for a wireless device from an access gateway of an alternate access network, wherein the network access request does not include an International Mobile Subscriber Identity (IMSI);
   authenticating, with the authentication server in response to receiving the network access request, the wireless device for access to the mobile service provider network;
   dynamically allocating, with the authentication server and in response to the authenticating, virtual mobility information for the wireless device that includes a virtual International Mobile Subscriber Identity (IMSI) not stored by a Home Location Register of the mobile service provider network;
   sending the virtual mobility information from the authentication server to the access gateway; and
   signaling, with the access gateway using the virtual mobility information, a mobile network gateway of the mobile service provider network to establish a service session for the wireless device over the alternate access network that is anchored by the mobile network gateway.

2. The method of claim 1,
   wherein dynamically allocating the virtual mobility information comprises obtaining, with the authentication server, the virtual mobility information for the wireless device from a subscriber database for the mobile service provider network,
   wherein the subscriber database does not operate as a Home Location Register for the mobile service provider network.

3. The method of claim 2, further comprising pre-populating the subscriber database with subscriber credentials and associating the subscriber credentials with respective virtual mobility information for corresponding subscribers.

4. The method of claim 3,
   wherein the network access request comprises subscriber credentials, and
   wherein the subscriber database maps the subscriber credentials to the corresponding virtual mobility information.

5. The method of claim 3, further comprising:
   obtaining, with the subscriber database, respective virtual mobility information for corresponding subscribers from a Home Location Register for the mobile service provider network, wherein the virtual mobility information for corresponding subscribers comprises actual mobility information for corresponding subscribers.

6. The method of claim 1, wherein the virtual IMSI is not associated with a subscriber for the wireless device in a Home Location Register for the mobile service provider network.

7. The method of claim 1, wherein the alternate access network comprises one of a Wi-Fi network, WiMAX network, or Wireless Local Area Network (WLAN) network and the access gateway comprises one of a Wi-Fi access gateway, WiMAX access gateway, WLAN access gateway.

8. The method of claim 1, wherein the access gateway comprises an S2a Mobility over General Packet Radio Service Tunneling Protocol (SaMOG) gateway that interfaces to the mobile network gateway using an S2a interface.

9. The method of claim 1, wherein signaling, with the access gateway using the virtual mobility information, the mobile network gateway comprises sending a create session request that includes the virtual IMSI to the mobile network gateway.

10. The method of claim 9, wherein signaling, with the access gateway using the virtual mobility information, the mobile network gateway comprises receiving a create session reply with the access gateway that includes an Internet Protocol (IP) address for the wireless device.

11. The method of claim 1, wherein the mobile service provider network comprises one of a Long Term Evolution (LTE) or Universal Mobile Telecommunications System (UMTS) architecture.

12. The method of claim 1, further comprising sending and receiving subscriber data traffic for the wireless device with the access gateway using the service session with the mobile network gateway.

13. The method of claim 1, further comprising:
    establishing a General Packet Radio Service Tunneling Protocol-User (GTP-U) tunnel connecting the access gateway and mobile network gateway for the service session; and
    mapping, with the access gateway, the GTP-U tunnel to a layer two (L2) connection in the alternate access network with the wireless device.

14. The method of claim 1, wherein the virtual mobility information comprises a non-default Access Point Name (APN) for the service session.

15. The method of claim 1, wherein the authorization server authenticates the wireless device using non-mobile authentication methods that do not require an IMSI.

16. The method of claim 1, wherein the virtual mobility information comprises an MSISDN number associated with a subscriber of the wireless device in a Home Location Register for the mobile service provider network, the method further comprising:
    charging the subscriber with the mobile network gateway using the MSISDN number.

17. The method of claim 1, wherein the virtual mobility information comprises a temporary MSISDN number, the method further comprising:
    charging the service session with the mobile network gateway using the temporary MSISDN number.

18. A method comprising:
    receiving, with an authentication server of a mobile service provider network, a network access request for a wireless device from an access gateway of an alternate access network, wherein the network access request does not include an International Mobile Subscriber Identity (IMSI), wherein the network access request comprises a MAC address for the wireless device;

in response to the network access request, obtaining virtual mobility information from a subscriber database for the mobile service provider network, wherein the virtual mobility information comprises a virtual International Mobile Subscriber Identity (IMSI);

assigning, with the subscriber database, the virtual mobility information for the wireless device and associating the MAC address with the virtual mobility information when the subscriber database does not include an association between the MAC address and the virtual mobility information;

assigning, with the subscriber database, the virtual mobility information associated with the MAC address when the subscriber database includes an association between the virtual mobility information and the MAC address;

sending the virtual mobility information from the authentication server to the access gateway; and signaling, with the access gateway using the virtual mobility information, a mobile network gateway of the mobile service provider network to establish a service session for the wireless device over the alternate access network that is anchored by the mobile network gateway.

19. A method performed by an access gateway of an alternate access network, the method comprising:

receiving a network access request for a wireless device, wherein the network access request does not include an International Mobile Subscriber Identity (IMSI);

extracting a wireless device identifier from the network access request;

sending the wireless device identifier to an authentication server to request mobility information for the wireless device;

receiving virtual mobility information for the wireless device from the authentication server, the virtual mobility information dynamically allocated by the authentication server in response to authenticating, in response to receiving the wireless device identifier, the wireless device for access to a mobile service provider network, wherein the virtual mobility information includes a virtual International Mobile Subscriber Identity (IMSI) not stored to a Home Location Register of the mobile service provider network; and signaling, using the virtual mobility information, a mobile network gateway of the mobile service provider network to establish a service session for the wireless device over the alternate access network that is anchored by the mobile network gateway.

20. The method of claim 19, wherein the wireless device identifier comprises one of a MAC address of the wireless device or subscriber credentials for a subscriber associated with the wireless device.

21. The method of claim 19, wherein the authentication server does not comprise a Home Location Register of the mobile service provider network.

22. An authentication system of a mobile service provider network, the authentication system comprising:

a Home Location Register;

a subscriber database that is separate from the Home Location Register; and an authentication server that receives a network access request for a wireless device from an access gateway of an alternate access network, wherein the network access request does not include an International Mobile Subscriber Identity (IMSI), wherein the authentication server authenticates, in response to receiving the network access request, the wireless device for access to the mobile service provider network, and wherein the authentication server sends a representation of the network access request to the subscriber database to request dynamic allocation of virtual mobility information for the wireless device that includes a virtual International Mobile Subscriber Identity (IMSI) not stored by the Home Location Register, wherein the subscriber database responds to the representation of the network access request with the virtual mobility information, wherein the virtual mobility information comprises a virtual International Mobile Subscriber Identity (IMSI), and wherein the authentication server sends the virtual mobility information to the access gateway.

23. A non-transitory computer-readable storage medium comprising instructions for causing one or more programmable processors of an access gateway of a mobile service provider network to:

receive a network access request for a wireless device, wherein the network access request does not include an International Mobile Subscriber Identity (IMSI);

extract a wireless device identifier from the network access request;

send the wireless device identifier to an authentication server to request mobility information for the wireless device;

receive, in response to the request, virtual mobility information for the wireless device from the authentication server, the virtual mobility information dynamically allocated by the authentication server in response to authenticating, in response to receiving the wireless device identifier, the wireless device for access to a mobile service provider network, wherein the virtual mobility information comprises a virtual International Mobile Subscriber Identity (IMSI) not stored to a Home Location Register of the mobile service provider network; and signal, using the virtual mobility information, a mobile network gateway of the mobile service provider network to establish a service session for the wireless device over the alternate access network that is anchored by the mobile network gateway.

24. A system comprising:

a mobile service provider network comprising a cellular access network and a Home Location Register;

an alternate access network comprising an access gateway;

a subscriber database for the mobile service provider network;

an authentication server of the mobile service provider network that receives a network access request for a wireless device from the access gateway, wherein the authentication server authenticates, in response to receiving the network access request, the wireless device for access to the mobile service provider network, and wherein the authentication server sends a representation of the network access request to the subscriber database to request dynamic allocation of virtual mobility information for the wireless device that includes a virtual International Mobile Subscriber Identity (IMSI) not stored by the Home Location Register, wherein the subscriber database responds to the request for dynamic allocation of the virtual mobility information with the virtual mobility information, wherein the representation of the network access request does not include an International Mobile Subscriber Identity (IMSI), wherein the virtual mobility information comprises a virtual IMSI, and wherein the access gateway uses the virtual mobility information to signal a mobile network gateway of the mobile service provider network to establish a service session for the wireless device over the alternate access network that is anchored by the mobile network gateway.

* * * * *